J. F. CRANSTON,

Assignor, by mesne assignments, to THE CRANSTON CENTER FIRE CARTRIDGE COMPANY.

Priming Metallic Cartridges.

No. 9,453. Reissued Nov. 9, 1880.

*Witnesses:*
H. E. Powers
I. Gardner.

*Inventor:*
J. F. Cranston
By Attorney
S W Wood

N. PETERS, PHOTO-LITHOGRAPHER, WASHINGTON, D. C.

UNITED STATES PATENT OFFICE.

THE CRANSTON CENTER FIRE CARTRIDGE COMPANY, OF NORWICH, CONN., ASSIGNEE, BY MESNE ASSIGNMENTS, OF JAMES F. CRANSTON.

PRIMING METALLIC CARTRIDGES.

SPECIFICATION forming part of Reissued Letters Patent No. 9,453, dated November 9, 1880.

Original No. 68,960, dated September 17, 1867. Application for reissue filed September 20, 1880.

*To all whom it may concern:*

Be it known that JAMES F. CRANSTON, of Springfield, county of Hampden, Commonwealth of Massachusetts, did invent new and useful Improvements in Metallic Cartridges; and I do hereby declare that the following is a full, clear, and exact description thereof, reference being had to the accompanying drawings, making part of this specification, in which—

Figure 1:
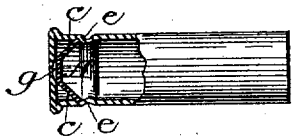
Figure 2:
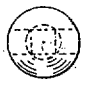
Figure 3:
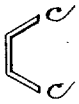

Figure 1 represents a case for a cartridge, partly in section, having the improvements applied thereto; Fig. 2, an end view thereof; Fig. 3, a side view of a bent anvil which retains the fulminate in a recess in the base of the case and upon which the fulminate is exploded.

The improvements relate to that class of cases for cartridges which are primed on the inside; and it consists in a case having an inwardly-projecting shoulder or shoulders for supporting and retaining the anvil in position therein when formed from the body or sides of the case, substantially as herein set forth; also, in a case for a cartridge primed on the inside, a bent anvil on which to explode the fulminate to ignite the powder in the body of the case when supported and retained in position by its edges resting upon an annular shoulder or shoulders, substantially in the manner herein described.

A in the accompanying drawings represents a case for a cartridge, partly in section, drawn from sheet metal in the usual manner, and having a flange, *b*, formed on its closed rear end the same as in other cases for cartridges so constructed. In the center of the head or closed end of this case, on the inside, is formed a depression or recess, *c*, to receive and hold the fulminate *d*. To confine and retain this fulminate in position in the recess, and to form a sufficiently-solid surface upon which to explode it to ignite the powder in the body of the cartridge, a bent anvil, *d*, is inserted therein from the front or open end, the flat surface *e* of which covers and confines the fulminate in its recess and serves as an anvil upon which to explode it. The sides or edges *f* of this anvil extend forward and against the inner surface of the case A, and rest upon an annular shoulder or shoulders, *m*, projecting inwardly, and which is formed from the sides of the case, as represented in Fig. 1. By forming this annular and inwardly-projecting shoulder from the body or sides of the case, and upon which shoulder the edges *f* of the anvil rest, the flat surface thereof is held firmly against the inner surface of the head, and, covering the fulminate therein, sufficient resistance to the blow of the hammer is obtained to prevent it being driven forward into the body of the case on the explosion of the cartridge.

Having fully described the invention, what is claimed therein as new, and desired to be secured by Letters Patent, is—

The combination, with a case having inwardly-projecting shoulders, of a bent anvil, its edges extending forward and supported by said shoulders, substantially as herein set forth.

CRANSTON CENTER FIRE CARTRIDGE COMPANY.
A. H. ALMY,
*President.*

Witnesses:
A. E. HOYT,
CHAS. H. HOYT.